United States Patent [19]

Caldwell et al.

[11] Patent Number: 4,877,303
[45] Date of Patent: Oct. 31, 1989

[54] FIBER OPTIC CONNECTOR ELEMENT & METHOD FOR ITS USE

[75] Inventors: Kevin G. Caldwell, Kanata; Steve J. Lischynsky; Elza V. Bagi, both of Ottawa, all of Canada

[73] Assignee: Northern Telecom Limited, Montreal, Canada

[21] Appl. No.: 247,465

[22] Filed: Sep. 22, 1988

[51] Int. Cl.$^4$ .......................... G02B 6/38; C03B 23/20
[52] U.S. Cl. ............................... 350/96.21; 350/96.20; 350/96.18; 350/320; 65/4.2; 65/36
[58] Field of Search ................ 350/96.18, 96.20, 96.21, 350/96.22, 96.23, 320; 65/4.1, 4.2, 4.3, 36

[56] References Cited

U.S. PATENT DOCUMENTS

| | | | |
|---|---|---|---|
| 4,220,394 | 9/1980 | Tardy | 350/96.20 |
| 4,290,667 | 9/1981 | Chown | 350/96.18 |
| 4,541,685 | 9/1985 | Anderson | 350/96.21 |
| 4,598,974 | 7/1986 | Munn et al. | 350/96.21 |
| 4,634,214 | 1/1987 | Cannon, Jr. et al. | 350/96.20 |
| 4,701,011 | 10/1987 | Emkey et al. | 350/96.18 |
| 4,725,117 | 2/1988 | Ellis | 350/96.20 |
| 4,737,006 | 4/1988 | Warbrick | 350/96.18 |
| 4,787,701 | 11/1988 | Stenger et al. | 350/96.21 |
| 4,814,118 | 3/1989 | Plummer et al. | 350/96.20 |
| 4,822,129 | 4/1989 | Webb | 350/96.18 |

FOREIGN PATENT DOCUMENTS

| | | | |
|---|---|---|---|
| 53-113565 | 10/1978 | Japan | 350/96.20 X |
| 54-158241 | 12/1979 | Japan | 350/96.21 X |
| 2184565 | 6/1987 | United Kingdom | 350/96.21 X |

OTHER PUBLICATIONS

Sono et al., "Graded-Index Rod Lenses", Laser Focus, Feb. 1981, vol. 17, No. 2, pp. 70-74.

Advertisement, Fiber Optic Product News, vol. 3, Mar. 1988.
Technical Description of Fast Assembly D4 Connector, NEC Corporation, undated.

Primary Examiner—William L. Sikes
Assistant Examiner—Brian M. Healy
Attorney, Agent, or Firm—C. W. Junkin

[57] ABSTRACT

An optical fiber connector element comprises: a connector body having a passage extending therethrough, the passage having a forward portion for receiving an optical fiber and a rearward portion which is wider than the forward portion for receiving an optical fiber and surrounding protective material; and an optical fiber stub secured within the forward portion of the passage, the optical fiber stub having a forward end surface which has an optical finish. The connector element is used to terminate an optical fiber cable by: cutting the cable to a desired length; stripping back an end portion of protective material surrounding an optical fiber of the cable to expose an end portion of the optical fiber; and securing the exposed fiber end portion and an end portion of the protective material remaining on the fiber in the connector body passage with the fiber end portion in abutment and axial alignment with the fiber stub. The steps of securing the fiber stub within the connector body passage, trimming the forward end portion of the fiber stub and polishing the forward end surface of the fiber stub may be performed under controlled factory conditions and the steps of cutting the cable to the desired length, stripping back the end portion of protective material, and securing the fiber end portion within the connector body passage may be performed under field conditions. The optical fiber connector element and its method of use avoid the need for polishing a fiber end to an optical finish under adverse field conditions.

17 Claims, 5 Drawing Sheets

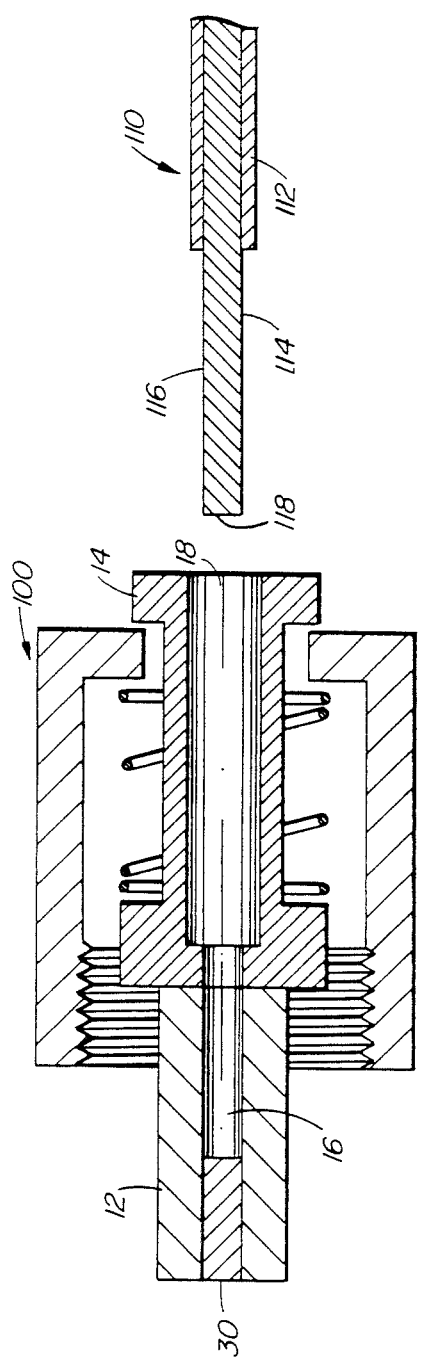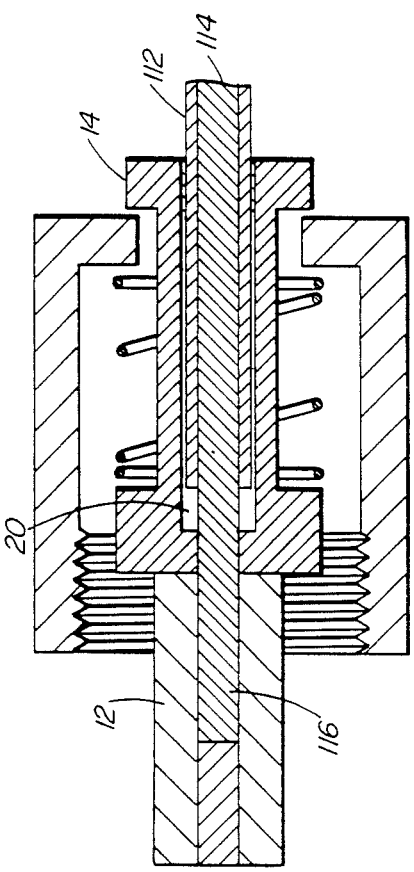
FIG. 2a
FIG. 2b

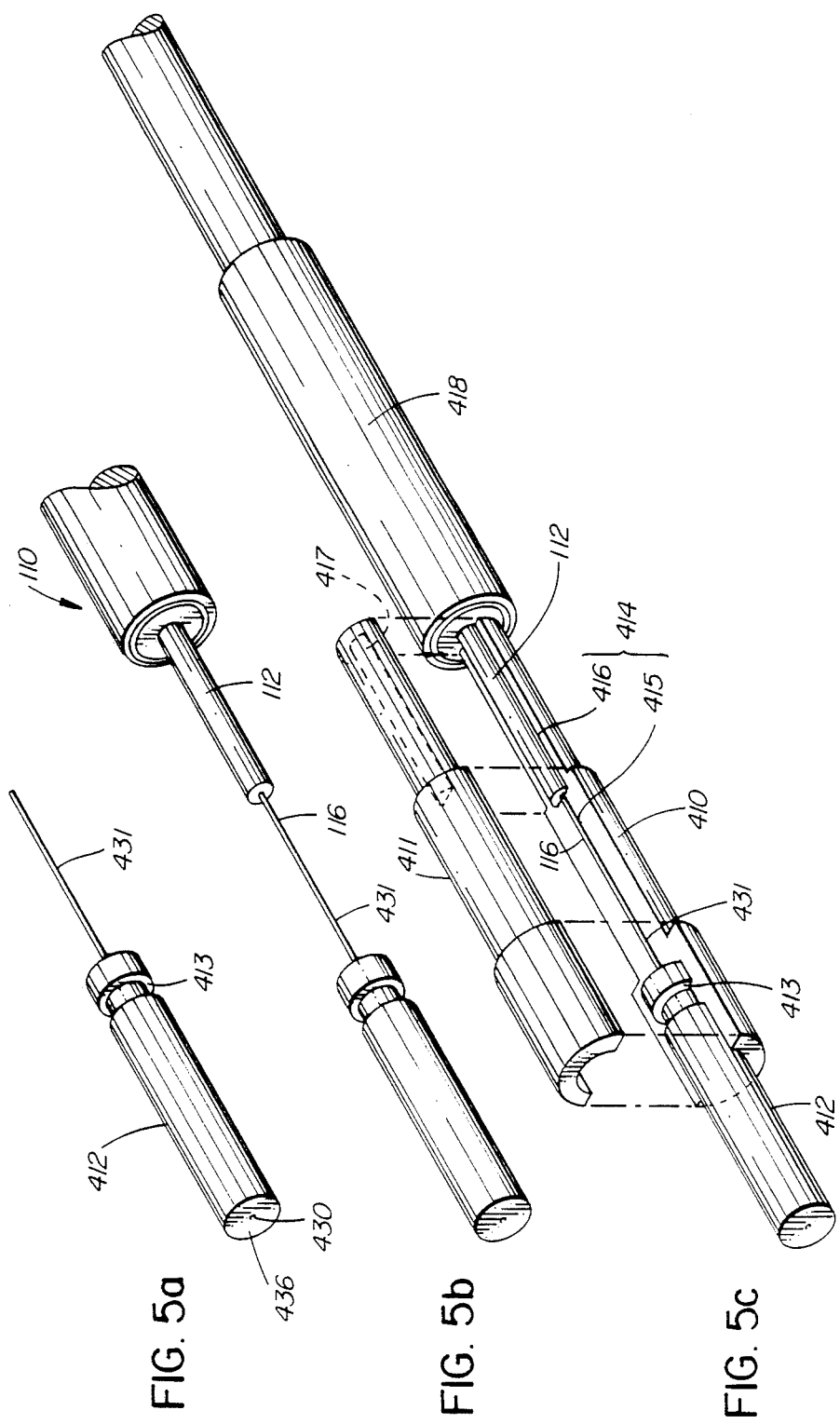

FIBER OPTIC CONNECTOR ELEMENT & METHOD FOR ITS USE

FIELD OF THE INVENTION

This invention relates to fiber optic connector elements for terminating optical fiber cables and methods for their use.

BACKGROUND OF THE INVENTION

A known type of fiber optic connector element for terminating an optical fiber cable comprises a generally cylindrical connector body having a passage extending axially through the body. The passage has a forward portion which has an inner diameter slightly greater than the outer diameter of an optical fiber and a rearward portion which has an inner diameter slightly greater than the outer diameter of a protective jacket or buffer surrounding the optical fiber. The connector body generally carries a screw or bayonet fitting. U.S. Pat. No. 4,541,685 issued Sept. 17, 1985 in the name of Jerry M. Anderson describes one example of this type of fiber optic connector element.

A fiber optic connector element of the type described above is mounted to a fiber optic cable by cutting the cable to a desired length, stripping back an end portion of the protective jacket or buffer to expose an end portion of an optical fiber protruding from the jacket or buffer, applying an adhesive to the protruding fiber, inserting the protruding fiber and an end portion of the remaining jacket or buffer into the rearward portion of the connector body passage and moving it forward until the protruding fiber extends through the forward portion of the passage to emerge from a forward end of the connector body, and securing a rearward portion of the connector body to the jacket or buffer in the passage, generally by crimping the rearward portion of the connector body onto the jacket or buffer. The adhesive applied to the fiber secures the fiber within the forward end of the passage.

Once the fiber and jacket are secured within the connector body, the fiber end emerging from the forward end of the connector body is trimmed flush with the forward end of the connector body, and carefully polished to an optical finish. The connector body may then be screw or bayonet mounted to another connector part to urge the forward end of the connector body into an alignment element (e.g. an alignment sleeve) for alignment of the fiber end with another similarly mounted fiber end.

Unfortunately, it is difficult and time consuming to polish the fiber end to an optical finish under field conditions where contaminants abound. Of course, the fiber cables could be terminated with the connector elements and the exposed fiber ends could be trimmed and polished in a factory under more controlled conditions, but this would require that the optical fiber cables be cut to the desired lengths before leaving the factory. The desired cable lengths are not generally known until the cables are at least partially installed, so factory termination of the cables is not generally feasible.

SUMMARY OF THE INVENTION

This invention obviates or mitigates the problems described above by providing an optical fiber connector element which can be used to terminate a fiber optic cable in the field without requiring the polishing of a fiber end to an optical finish in the field. This invention further provides a method for the use of such a fiber optic connector element.

Thus, one aspect of the invention provides an optical fiber connector element for terminating an optical fiber cable, the connector element comprising:

a connector body having a passage extending therethrough, the passage having a forward portion for receiving an optical fiber and a rearward portion which is wider than the forward portion for receiving an optical fiber and surrounding protective material; and an optical fiber stub secured within the forward portion of the passage, the optical fiber stub having a forward end surface which has an optical finish.

Another aspect of the invention provides a method for terminating a fiber optic cable with a fiber optic connector element, the method comprising:

providing a connector element comprising a connector body having a passage extending therethrough, the passage having a forward portion for receiving an optical fiber and a rearward portion which is wider than the forward portion for receiving an optical fiber and surrounding protective material, and an optical fiber stub secured within the forward portion of the passage, the optical fiber stub having a forward end surface which has an optical finish;

cutting the cable to a desired length;

stripping back an end portion of protective material surrounding an optical fiber of the cable to expose an end portion of the optical fiber; and securing the exposed fiber end portion and an end portion of the protective material remaining on the fiber in the connector body passage with the fiber end portion in abutment and axial alignment with the fiber stub.

The steps of securing the fiber stub within the connector body passage, trimming the forward end portion of the fiber stub and polishing the forward end surface of the fiber stub may be performed under controlled factory conditions, while the steps of cutting the cable to the desired length, stripping back the end portion of protective material, and securing the fiber end portion within the connector body passage may be performed as required under normal field conditions. Hence, the optical fiber connector element according to the invention and its method of use according to the invention avoid the need for polishing a fiber end to an optical finish under adverse field conditions.

BRIEF DESCRIPTION OF THE DRAWINGS

Embodiments of the invention will now be described by way of example only with reference to the accompanying drawings in which:

FIGS. 2a-2c are cross-sectional views of the optical fiber connector element of FIGS. 1a-1c at successive stages of its use to terminate a fiber optic cable;

FIGS. 5a-5c are perspective views of an optical fiber connector element according to a fourth embodiment at successive stages in its assembly.

DESCRIPTION OF EMBODIMENTS

Figure 1A:
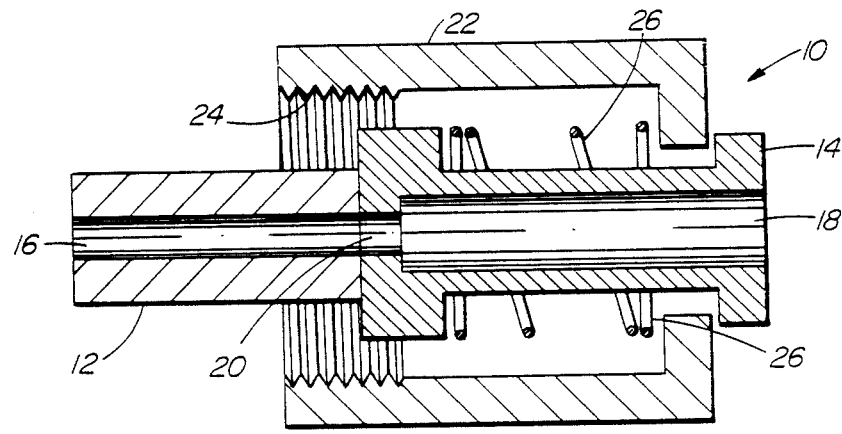
FIGS. 1a-1c are cross-sectional views of an optical fiber connector element according to a first embodiment at successive stages in its assembly.

FIG. 1a illustrates an optical fiber connector generally cylindrical aluminum member 14 secured to the ferrule 12 to extend rearward of the ferrule 12. The ferrule 12 has an axial bore 16 and the member 14 has an axial bore 18 which has a larger inner diameter than the bore 16 of the ferrule 12 and which is axially aligned with the bore 16 of the ferrule 12. The bores 16, 18 together define a passage 20 extending through the connector body 10, the bore 16 of the ferrule 12 defining a forward portion of the passage 20, and the bore 18 of the member 14 defining a rearward portion of the passage 20, the rearward portion being wider than the forward portion.

The optical connector element further comprises securing means in the form of a sleeve 22 rotatably mounted to the member 14. The sleeve 22 has an internal thread formation 24 which mates with a complementary thread formation of another connector body as will be described be described below. Resilient means in the form of a coil spring 26 acts between the sleeve and the connector body 10 to urge the connector body 10 axially forward relative to the sleeve 22.

Figure 1B:
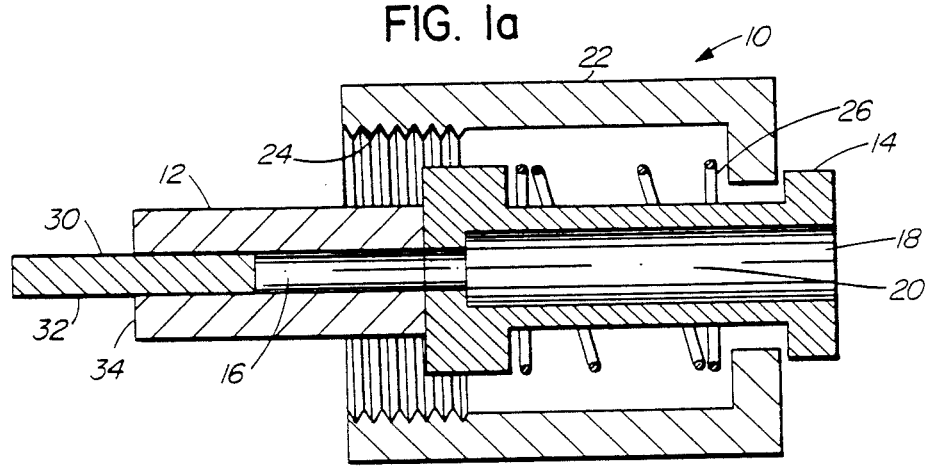
Figure 1C:
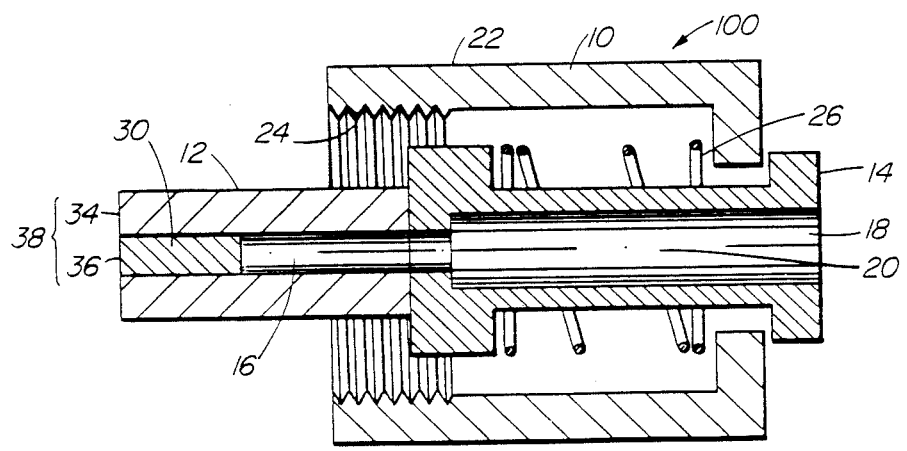

FIGS. 1b and 1c illustrate the assembly of the an optical fiber connector element 100 according to a first embodiment which employs the optical fiber connector body 10. An optical fiber is cleaved to form an optical fiber stub 30, an adhesive is applied to the circumferential surface of the fiber stub 30, the fiber stub 30 is inserted into the forward end of the ferrule bore 16, and the adhesive is hardened to secure the fiber stub 30 in the forward end of the ferrule bore 16 as shown in FIG. 1b. A forward end portion 32 of the fiber stub 30 which protrudes beyond a forward end surface 34 of the ferrule 12 is trimmed at the forward end surface 34 of the ferrule 12 to define a forward end surface 36 of the fiber stub 30, and the forward end surface 36 of the fiber stub 30 is polished together with the forward end surface 34 of the ferrule 12 to define a continuous planar polished surface 38 and to bring the forward end surface 36 of the fiber stub 30 to an optical finish, as shown in FIG. 1c.

The assembly of the optical connector element as shown in FIGS. 1a-1c is performed under controlled factory conditions. For example, the polishing operation is performed under clean room conditions with specialized polishing equipment to provide a high quality optical finish quickly and with a minimum of particulate contamination.

Figure 2C:
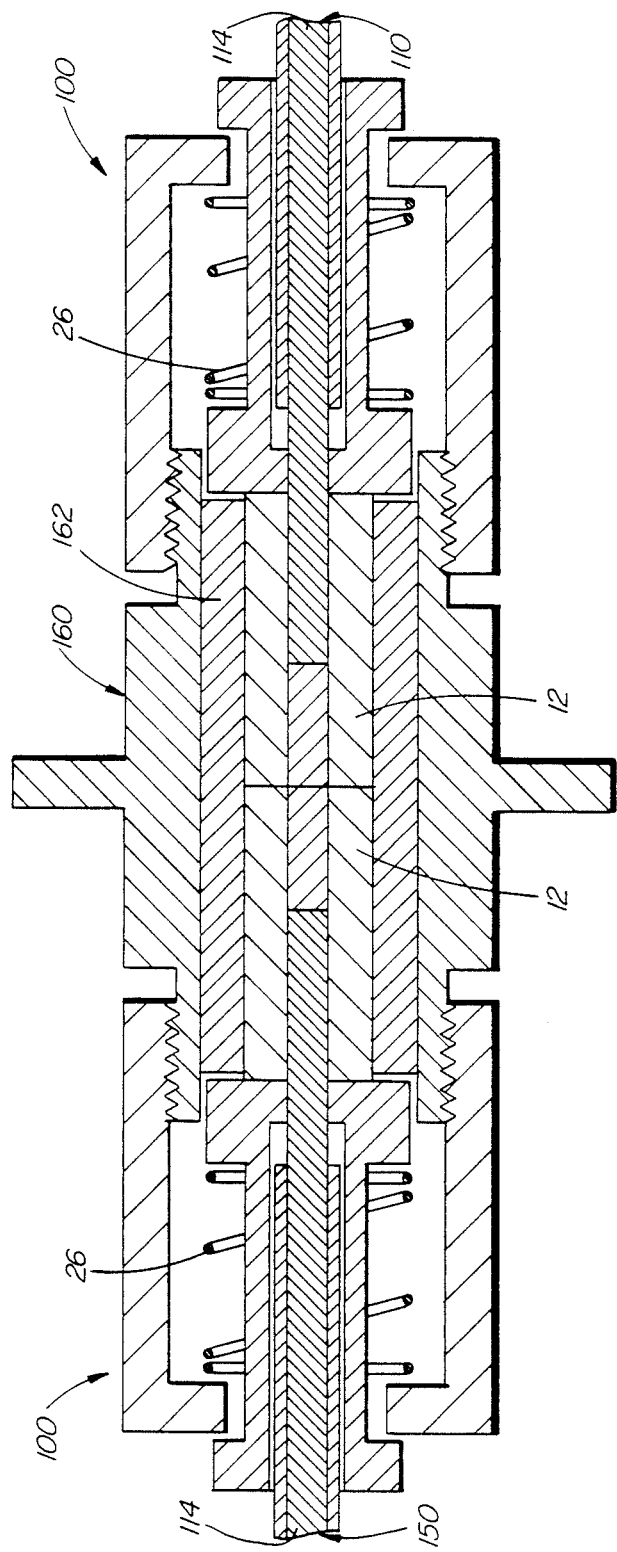

FIGS. 2a-2c illustrate the termination of an optical fiber cable 110 with the optical fiber connector element 100 and the use of the optical fiber connector element 100 to connect the cable 110 to another similarly terminated cable 150. The cable 110 is cut to a desired length and an end portion of protective material 112 surrounding an optical fiber 114 of the cable 110 is stripped back to expose an end portion 116 of the optical fiber 114, as shown in FIG. 2a. Index matching material is applied to a cleaved end surface 118 of the optical fiber 114, an adhesive is applied to the circumferential surface of the fiber end portion 116, and the fiber end portion 116 and an end portion 120 of the protective material 112 remaining on the fiber 114 are inserted into the bore 18 of the member 14. The fiber end portion 116 is moved forwardly into the bore 16 of the ferrule 12 into abutment with the fiber stub 30 to axially align the fiber end portion 116 with the fiber stub 30. The adhesive is hardened to secure the fiber end portion 116 in the passage 20 of the connector body 10, as shown in FIG. 2b.

The terminated cable 110 is connected to a similarly terminated cable 150 by inserting the ferrule 12 of the connector element 100 mounted to each cable 110, 150 into a respective end of a connector part 160 and screwing the connector body 10 of each connector element 100 to the connector part 160, as shown in FIG. 2c. The ferrules 12 enter a precision alignment sleeve 162 of the connector part 160 where they are retained in axial alignment and abutment so as to optically connect the fibers 114 of the cables 110, 150. The coil springs 26 bring the polished end faces 34, 36 of the ferrules 12 and optical fiber stubs 30 into abutment with a controlled end force.

The termination and connection of the optical fiber cables 110, 150 as shown in FIGS. 2a-2c are performed under field conditions. While some effort is required to avoid particulate contamination while performing these steps, the requirements are less stringent than those for the connector element assembly steps shown in FIGS. 1a-1c, particularly the polishing step. Moreover, the polishing step requires specialized equipment which is difficult to operate in the field. Thus, separation of the steps into factory and field operations simplifies the overall operation and provides better results.

Figure 3:
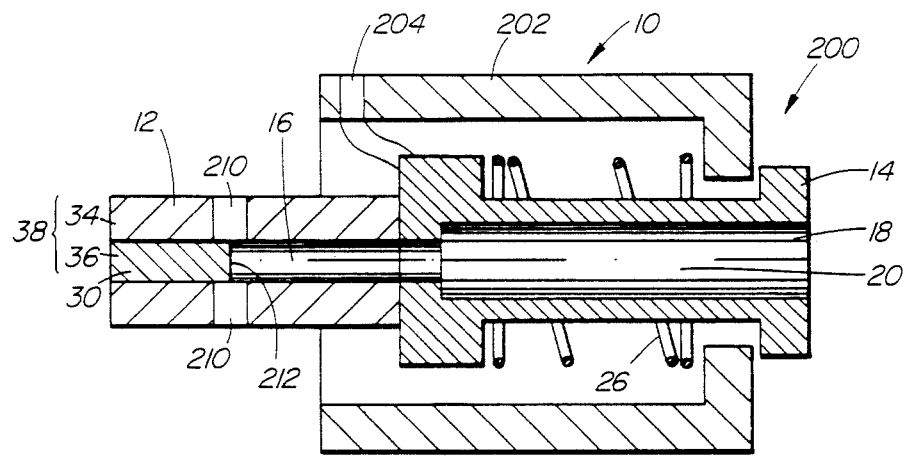
FIG. 3 is a cross-sectional view of an optical fiber connector element according to a second embodiment.

FIG. 3 illustrates a connector element 200 according to a second embodiment. The connector element 200 is generally similar to the connector element 100 according to the first embodiment, and the same reference numerals are used to identify like parts. However, the securing means in the form of a rotatable sleeve 22 having an internal thread formation 24 is replaced with securing means in the form of a rotatable bayonet fitting 202 having a helical slot 204 for mating with a complementary bayonet fitting to secure the connector body 10 to a connector part which is similar to the connector part 160 except that it has a bayonet fitting. In addition to a different securing means, the ferrule 12 of the connector element 200 has two opposed lateral openings 210 which expose a rearward end 212 of the optical fiber stub 30.

In the use of the connector element 200 to terminate an optical fiber cable, no index matching material or adhesive need be applied to the fiber end portion 116. Instead, the fiber end portion 116 is inserted into the bore 18 of the member 14 and moved forwardly into the bore 16 of the ferrule 12 into abutment with the fiber stub 30 to axially align the fiber end portion 116 with the fiber stub 30. Electrodes of electrical arc fusion splicing equipment are aligned with the openings 210, and an electrical arc is applied through the openings to fusion splice the fiber end portion 116 to the fiber stub 30. The assembly and use of the connector element 200 according to the second embodiment is otherwise similar to the assembly and use of the connector element 100 according to the first embodiment.

Figure 4:
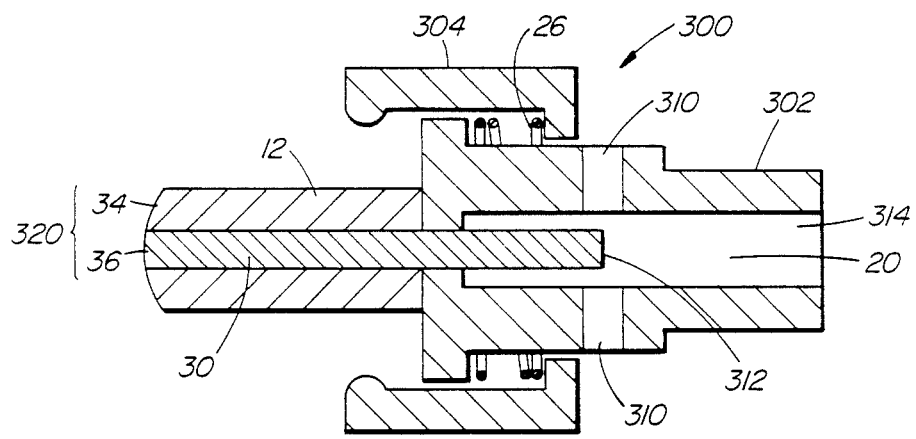
FIG. 4 is a cross-sectional view of an optical fiber connector element according to a third embodiment.

FIG. 4 illustrates a connector element 300 according to a third embodiment. The connector element 300 is generally similar to the connector element 100 according to the first embodiment, and the same reference numerals are used to identify like parts. However, the aluminum member 14 is replaced with a precision molded plastic member 302 and securing means in the form of a rotatable sleeve 22 having an internal thread formation 24 is replaced with securing means in the form of resilient latch formations 304 for mating with complementary latch formations to secure the connector body 10 to a connector part which is similar to the connector part 160 except that it has latch formations. The member 302 has two opposed lateral openings 310 which expose a rearward end 312 of the optical fiber stub 30 which, in this embodiment, extends into a bore 314 of the member 302. The forward end surface 36 of the fiber stub 30 is polished together with the forward end surface 34 of the ferrule 12 to define a continuous convex polished surface 320 instead of the continuous planar polished surface 38 of the connector element 100 according to the first embodiment.

In the use of the connector element 300 to terminate an optical fiber cable, no index matching material or adhesive need be applied to the fiber end portion 116. Instead, the fiber end portion 116 is inserted into the bore 314 of the member 302 and moved forwardly into abutment with the fiber stub 30. The fiber end portion 116 is moved laterally within the bore 314 using a micromanipulator while monitoring optical transmission between the fiber end portion 116 and fiber stub 30 to axially align the fiber end portion 116 with the fiber stub 30. Electrodes of electrical arc fusion splicing equipment are aligned with the openings 310, and an electrical arc is applied through the openings to fusion splice the fiber end portion 116 to the fiber stub 30. The assembly and use of the connector element 300 according to the second embodiment is otherwise similar to the assembly and use of the connector element 100 according to the first embodiment.

Use of a convex polished surface 320 instead of a planar polished surface as in the first embodiment ensures physical contact between the optical fiber stubs 30 in the mated connector bodies, thereby improving optical coupling efficiency when two fiber cables are connected.

An optical fiber connector element according to a fourth embodiment is illustrated in FIGS. 5a–5c. Referring to FIG. 5a, the connector element has a connector body comprising a precision ferrule 412 having an axial bore in which an optical fiber stub 430 is fixed. The optical fiber stub 430 is provided with a forward surface 436 having an optical finish and a rearward end portion 431 which projects rearward from the ferrule 412. The ferrule 412 has an outer surface formation in the form of a circumferential groove 413.

An optical fiber cable 110 is cut to a desired length, and an end portion of protective material 112 surrounding an optical fiber 114 of the cable 110 is stripped back to expose an end portion 116 of the optical fiber 114 as shown in FIG. 5b. The fiber end portion 116 and the projecting end portion 431 of the fiber stub 430 are aligned and spliced together in a fusion splicing apparatus.

The connector body further comprises a cable mount part in the form of a base member 410 and a cover member 411 as shown in FIG. 5c. The base and cover members 410, 411 have internal surface formations in the form of semiannular ribs which are complementary to the circumferential groove 413 of the ferrule 412. The base member 410 has an axially extending groove 414 which has a forward portion in the form of a v-groove 415 and a rearward portion in the form a semi-cylindrical groove 416 which is deeper than the v-groove 415. The cover member 411 has a semi-cylindrical groove 417 which aligns with the semicylindrical groove 416 of the base member 410 to define a cylindrical passage when the cover member 412 is mated with the base member 410.

The v-groove 415 of the base member 410 is axially aligned with the axial bore of the ferrule and the spliced fiber and fiber stub end portions 116, 431 are placed in the groove 415 as shown in FIG. 5c. The protective material 112 surrounding the fiber end portion fits in the semi-cylindrical groove 416.

The base and cover members 410, 411 are coated with adhesive and mated to secure the fiber end portion 116 and surrounding protective material 112 in the groove 414. The semiannular ribs mate with the circumferential groove 413 of the ferrule 412 to secure the base and cover members 410, 411 to the ferrule 412 with the base and cover members 410, 411 extending rearward from the ferrule 412.

When the base and cover members 410, 411 are mated and secured to the ferrule 412, the base and cover members 410, 411 together with the ferrule 412 define a connector body. The axial bore of the ferrule 412 and the v-groove 415 of the base member together define a forward portion of a passage for receiving the fiber stub 430 and fiber end portion 116. The semi-cylindrical grooves 416, 417 together define a cylindrical rearward portion of the passage which is wider than the forward portion for receiving the optical fiber 114 and surrounding protective material 112.

A crimp sleeve 418 is fitted over the base and cover members 410, 411 and compressed onto the cover and base members 410, 411 to further secure the ferrule 412 to the cover and base members 410, 411 and to retain the fiber end portion 116 and surrounding protective material 112 within the groove 414.

The v-groove 415 of the base member 410 can be used to align the fiber and fiber stub end portions 116, 431 during splicing, and splicing techniques other than fusion splicing can be used in conjunction with the connector element according to the fourth embodiment. For example, adhesive could be applied to the v-groove 415 to form an adhesive splice, or an elastomeric element could be carried by the cover member 411 to press the fiber and fiber stub end portions 116, 431 into the v-groove 415 when the cover and base members 410, 411 are mated to form an elastomeric splice.

In each of the embodiments described above, the optical characteristics and dimensions of the optical fiber stub may be chosen to provide mode stripping of high order modes for multimode fiber or single mode fiber operating below its cutoff wavelength. Mode stripping at some or all connectors will reduce pulse dispersion in optical fibers between the connectors.

The optical fiber stub may be especially selected to have a low eccentricity of core to cladding and to have an optimum fit in the forward portion of the passage. Such selection further reduces loss when connector elements are mated.

The embodiments described above are meant to illustrate the invention and not to limit the scope of the invention as defined by the following claims.

We claim:
1. An optical fiber connector element for terminating an optical fiber cable, the connector element comprising:
    a connector body having a passage extending therethrough, the passage having a forward portion for receiving an optical fiber and a rearward portion which is wider than the forward portion for receiving an optical fiber and surrounding protective material; and an optical fiber stub secured within the forward portion of the passage, the optical fiber stub having a forward end surface which has an optical finish;

wherein the connector body has at least one lateral opening exposing a rearward end of the optical fiber stub for providing access to the rearward end of the stub by fusion splicing equipment; and wherein the rearward end of the optical fiber stub is within the forward portion of the passage and the opening provides access to the forward portion of the passage.

2. An optical fiber connector element for terminating an optical fiber cable, the connector element comprising:

a connector body having a passage extending therethrough, the passage having a forward portion for receiving an optical fiber and a rearward portion which is wider than the forward portion for receiving an optical fiber and surrounding protective material; and an optical fiber stub secured within the forward portion of the passage, the optical fiber stub having a forward end surface which has an optical finish;

wherein the connector body comprises:

a precision ferrule having an axial bore which defines the forward portion of the passage; and a cable mount part securable to the ferrule to extend rearward of the ferrule, the cable mount part having an axial bore which is axially aligned with the axial bore of the ferrule and which defines the rearward portion of the passage when the cable mount part is secured to the ferrule.

3. An optical fiber connector element for terminating an optical fiber cable, the connector element comprising:

a precision ferrule having an axial bore extending therethrough;

an optical fiber stub secured within the axial bore of the ferrule, the stub having a forward end surface which has an optical finish and a projecting portion which projects rearward from the ferrule; and a cable mount part which is securable to the ferrule to extend rearward of the ferrule, the cable mount part comprising:

a base member having an axially extending groove, the groove having a forward portion for receiving and aligning the projecting portion of the optical fiber stub and an end portion of the optical fiber, and a rearward portion which is deeper than the forward portion for receiving a portion of the optical fiber and surrounding protective material; and a cover member for mating with the base member to retain the fiber portion and surrounding protective material.

4. An optical fiber connector element as defined in claim 3, wherein the forward portion of the groove is a v-groove.

5. An optical fiber connector element as defined in claim 4, wherein the rearward portion of the groove is a semi-cylindrical groove, and the cover member has a semi-cylindrical groove which aligns with the semicylindrical groove of the base member to define a cylindrical passage when the cover member is mated with the base member.

6. An optical fiber connector element as defined in claim 3, wherein the ferrule has an outer surface formation, and the base member and the cover member have inner surface formations which are complementary to the outer surface formation of the ferrule for mating with the outer surface formation of the ferrule to secure the ferrule to the cable mount part when the cover member is mated with the base member.

7. An optical fiber connector element as defined in claim 6, wherein the cable mount part further comprises a crimp sleeve fitting over the base member and cover member when the cover member is mated with the base member and compressible onto the cover member and base member to secure the ferrule to the cable mount part and to retain the fiber portion and surrounding protective material within the cable mount part.

8. An optical fiber connector element for terminating an optical fiber cable, the connector element comprising:

a connector body having a passage extending therethrough, the passage having a forward portion for receiving an optical fiber and a rearward portion which is wider than the forward portion for receiving an optical fiber and surrounding protective material, the connector body having at least one lateral opening; and an optical fiber stub secured within the forward portion of the passage, the optical fiber stub having a forward end surface which has an optical finish;

wherein the connector body has a forward end surface which is continuous with the forward end surface of the optical fiber stub and the forward end surface of the connector body and the forward end surface of the optical fiber stub define a continuous convex surface.

9. A method for terminating a fiber optic cable with a fiber optic connector element, the method comprising:

providing an optical fiber connector element by:

providing a connector body having a passage extending therethrough, the passage having a forward portion for receiving an optical fiber and a rearward portion which is wider than the forward portion for receiving an optical fiber and surrounding protective material;

securing an optical fiber stub within the forward portion of the passage, the fiber stub having a forward end portion which extends beyond a forward end surface of the connector body;

trimming the forward end portion of the fiber stub at the forward end surface of the connector body to define a forward end surface of the fiber stub; and polishing the forward end surface of the fiber stub to an optical finish; cutting the cable to a desired length;

stripping back an end portion of protective material surrounding an optical fiber of the cable to expose an end portion of the optical fiber; and securing the exposed fiber end portion and an end portion of the protective material remaining on the fiber in the connector body passage with the fiber end portion in abutment and axial alignment with the fiber stub.

10. A method as defined in claim 9, comprising polishing the forward end surface of the fiber stub and the forward end surface of the connector body in a single polishing operation to define a continuous polished surface.

11. A method as defined in claim 10, comprising polishing the forward end surface of the fiber stub and forward end surface of the connector body in a single polishing operation to define a convex continuous polished surface.

12. A method as defined in claim 9, comprising securing the fiber stub within the connector body passage, trimming the forward end portion of the fiber stub and polishing the forward end surface of the fiber stub under controlled factory conditions; and cutting the cable to the desired length, stripping back the end portion of protective material, and inserting, aligning and securing the fiber end portion within the connector body passage under field conditions.

13. A method for terminating a fiber optic cable with a fiber optic connector element, the method comprising:

providing a connector element comprising a connector body having a passage extending therethrough, the passage having a forward portion for receiving an optical fiber and a rearward portion which is wider than the forward portion for receiving an optical fiber and surrounding protective material, and an optical fiber stub secured within the forward portion of the passage, the optical fiber stub having a forward end surface which has an optical finish;

cutting the cable to a desired length;

stripping back an end portion of protective material surrounding an optical fiber of the cable to expose an end portion of the optical fiber;

inserting the exposed fiber end portions and an end portion of the protective material remaining on the fiber into the rearward portion of the connector body passage;

moving the fiber end portion within the connector body passage into abutment and axial alignment with the fiber stub; and securing the fiber end portion within the connector body passage in abutment and axial alignment with the fiber stub;

wherein the rearward end of the fiber stub is within the forward portion of the connector body passage and the fiber end portion is axially aligned with the fiber stub by moving the fiber end portion forwardly into the forward portion of the connector body passage into abutment with the fiber stub.

14. A method for terminating a fiber optic cable with a fiber optic connector element, the method comprising:

providing a connector element comprising a connector body having a passage extending therethrough, the passage having a forward portion for receiving an optical fiber and a rearward portion which is wider than the forward portion for receiving an optical fiber and surrounding protective material, and an optical fiber stub secured within the forward portion of the passage, the optical fiber stub having a forward end surface which has an optical finish;

cutting the cable to a desired length;

stripping back and end portion of protective material surrounding an optical fiber of the cable to expose an end portion of the optical fiber;

inserting the exposed fiber end portion and an end portion of the protective material remaining on the fiber into the rearward portion of the connector body passage;

moving the fiber end portion within the connector body passage into abutment and axial alignment with the fiber stub; and securing the fiber end portion within the connector body passage in abutment and axial alignment with the fiber stub;

wherein the rearward end of the fiber stub is within the rearward portion of the passage and the fiber end portion is axially aligned with the fiber stub by moving the fiber end portion laterally within the rearward portion of the connector body passage while monitoring optical transmission between the fiber end portion and the fiber stub.

15. A method for terminating a fiber optic cable with a fiber optic connector element, the method comprising:

providing a connector element which comprises a connector body comprising a precision ferrule having an axial bore which defines a forward portion of a passage through the connector body and a cable mount part comprising a base member having an axially extending groove which defines a rearward portion of the passage through the connector body and a cover member, and an optical fiber stub secured within the forward portion of the passage, the optical fiber stub having a forward end surface which has an optical finish and projecting rearward from the ferrule;

cutting the cable to a desired length;

stripping back an end portion of protective material surrounding an optical fiber of the cable to expose an end portion of the optical fiber; and securing the fiber end portion and the end portion of protective material in the connector body passage by:

aligning and abutting the projecting optical fiber stub and the exposed fiber end portion in the groove of the base member;

splicing the projecting optical fiber stub to the exposed fiber end portion;

axially aligning the groove with the axial bore of the ferrule; and mating the cover member to the base member to secure the fiber end portion and surrounding protective material in the groove and to secure the base and cover members to the ferrule with the base and cover members extending rearward from the ferrule.

16. A method for terminating a fiber optic cable with a fiber optic connector element, the method comprising:

providing a connector element which comprises a connector body comprising a precision ferrule having an axial bore which defines a forward portion of a passage through the connector body and a cable mount part comprising a base member having an axially extending groove which defines a rearward portion of the passage through the connector body and a cover member, and an optical fiber stub secured within the forward portion of the passage, the optical fiber stub having a forward end surface which has an optical finish and projecting rearward from the ferrule;

cutting the cable to a desired length;

stripping back an end portion of protective material surrounding an optical fiber of the cable to expose and end portion of the optical fiber; and securing the first end portion and the end portion of protective material in the connector body passage by:

fusion splicing the projecting optical fiber stub to the exposed fiber end portion;

axially aligning the groove with the axial bore of the ferrule and placing the spliced optical fiber stub and fiber end portion in the groove; and mating the cover member to the base member to secure the fiber end portion and surrounding protective material in the groove and to secure the base and cover members to the ferrule with the base and cover members extending rearward from the ferrule.

17. A method as defined in claim 15 or claim 16, further comprising:

fitting a crimp sleeve over the base member and cover member when the cover member is mated with the base member; and compressing the crimp sleeve onto the cover member and base member to secure the ferrule to the cable mount part and to retain the fiber portion and surrounding protective material within the cable mount part.

* * * * *